United States Patent [19]
Mifune et al.

[11] Patent Number: 5,300,355
[45] Date of Patent: Apr. 5, 1994

[54] VIBRATION DAMPING MATERIAL

[75] Inventors: Naoto Mifune, Tokyo; Yasutaka Nagai, Kanagawa; Masaaki Ashizawa, Kanagawa; Kazuo Nishimoto, Kanagawa; Takahiro Niwa, Kanagawa; Shuji Ito, Saitama; Masanori Hansaka, Tokyo, all of Japan

[73] Assignees: Nichias Corporation; Railway Technical Research Institute, both of Tokyo, Japan

[21] Appl. No.: 886,424

[22] Filed: May 20, 1992

[30] Foreign Application Priority Data

May 31, 1991 [JP] Japan .................................. 3-155101
Mar. 13, 1992 [JP] Japan .................................. 4-089898

[51] Int. Cl.$^5$ .............................................. B32B 15/18
[52] U.S. Cl. .................................. 428/215; 248/206.5; 248/634; 428/213; 428/220; 428/329; 428/332; 428/337; 428/461; 428/462; 428/463; 428/492; 428/494; 428/688; 428/689; 428/900
[58] Field of Search ..................... 248/206.5, 610, 632, 248/634; 428/213, 220, 329, 332, 337, 492, 494, 688, 689, 460, 461, 462, 463, 900, 215, 214

[56] References Cited

FOREIGN PATENT DOCUMENTS 3-47750  2/1991  Japan .
3-159735 7/1991  Japan .

*Primary Examiner*—Paul J. Thibodeau
*Assistant Examiner*—D. S. Nakarani
*Attorney, Agent, or Firm*—Flynn, Thiel, Boutell & Tanis

[57] ABSTRACT

In order to provide a damping material exhibiting an excellent vibration damping property in a wide temperature range, according to the present invention, in a magnetic composite type damping material constructed by bonding an adhesive elastic sheet containing magnetic powder to a constraining plate such as a metal plate by using an adhesive, the adhesive elastic sheet is made of a composite material consisting of rubber elastomer, adhesive resin, plasticizer, magnetic powder, etc.

Since not only is the damping material having a construction described above attracted by magnetic force against a vibration source, it also is provided with a superficial adhesiveness, and the excellent vibration damping property is exhibited in a wide temperature range by a synergistic effect of the magnetic force and the adhering force.

5 Claims, 4 Drawing Sheets

VIBRATION DAMPING MATERIAL

FIELD OF THE INVENTION

The present invention relates to an improvement of a vibration damping material, by which it is attracted to a vibration source by magnetic force.

BACKGROUND OF THE INVENTION

A magnetic composite type damping material of the type described above is disclosed in JP-A-Hei 3-47750, in which an adhesive layer is disposed between a magnetic layer and a constraining layer to form a three-layered structure, the damping material having this three-layered structure being directly attracted to a vibration source by magnetic force of the magnetic layer.

Since the magnetic composite type damping material having the structure described above can be attracted to the vibration source by magnetic force, operability of mounting on the vibration source is good. Further, it has a structure in which an adhesive layer having a low elastic modulus is sandwiched between the magnetic layer having a high elastic modulus and the constraining layer. Shear deformation is produced in the adhesive layer by vibration generated by the vibration source. Vibration energy is converted into thermal energy by shear deformation mainly in the adhesive layer and, thus, the vibration is absorbed.

Further, a damping material having a structure, in which a magnetic material is disposed in the constraining layer, can be directly attracted to a vibration source by magnetic force. So its operability of mounting on the vibration source is good.

Further, in this case, slight slips are produced at the interface of the magnetic layer with the vibration source by vibration generated by the vibration source owing to the fact that it is attracted to the vibration source only by magnetic force. Vibration energy is converted into thermal energy by interfacial friction, which makes it exhibit a vibration damping property.

In a sandwich type damping material having a structure in which an adhesive material (e.g. rubber, etc.) having a small elastic modulus is sandwiched between two constraining plates such as metal plates having a great elastic modulus, in which shear deformation is produced in the sandwiched adhesive material by vibration and in this way vibration energy is converted into thermal energy, in order to transmit vibration generated by the vibration source to the adhesive material having a small elastic modulus, the damping material should be stuck firmly to the vibration source.

As a method for firmly sticking the damping material to the vibration source, it can be tentatively conceived to use adhesive force of an adhesive or mechanical fixing means such as screws, etc. Supposing temporarily that the magnetic composite type damping material described previously is stuck by using an adhesive, although vibration absorbing action by interfacial friction described above cannot be expected, since it is possible to have the damping material held on the vibration source by magnetic force until the adhesive is hardened, it is not necessary to use any holding member by thrusting it with pressure, which is very useful for improving facility of execution.

However, in a damping material, closely contacted with a vibration source by magnetic force, in which vibration damping is realized by converting vibration energy into thermal energy by interfacial friction at a close contact interface, as in the magnetic composite type damping material described previously, although vibration damping characteristics thereof have a property that its temperature dependence is small and that a constant performance can be obtained in a wide temperature range, the absolute value of the loss factor, which indicates the vibration damping effect, is smaller than a peak value thereof of a general constraining type damping material described previously.

Although a general constraining type damping material has the peak of the loss factor in the neighborhood of the glass transition temperature of the adhesive elastic material, supposing temporarily that it is used in a relatively narrow temperature range around the peak, since the loss factor of the magnetic composite type damping material described above is smaller than that of the general constraining type damping material, it is disadvantageous.

However, taking it into account that in a constraining type damping material using shear deformation of the close contact interface, in which vibration damping is performed by converting vibration energy into thermal energy, vibration damping property (loss factor) decreases rapidly apart from the neighborhood of the glass transition temperature of the adhesive material, it can be understood that the magnetic composite type damping material described above is more advantageous in that constant performance can be obtained in a wide temperature range, although the absolute value of the loss factor is not so great.

OBJECT OF THE INVENTION

A first object of the present invention is to provide a new magnetic composite type damping material having characteristics of the constraining type damping material.

A second object of the present invention is to provide a magnetic composite type damping material, in which a close contact property is improved by making it more adaptable to an uneven surface of a vibrating body, and is devised so as to remove problems described later of a first invention made in order to achieve the above first object.

SUMMARY OF THE INVENTION

In order to achieve the above first object, a magnetic composite type damping material according to the present invention constructed by sticking a magnetic composite sheet adhesive to a constraining plate by using an adhesive is characterized in that the magnetic composite adhesive sheet is made of a composite material consisting of rubber, elastomer, adhesive resin, plasticizer, magnetic powder, etc., and that the amounts of the adhesive resin and the plasticizer in the sheet described above are 30 to 90 weight parts and 5 to 100 weight parts, respectively, with respect to 100 weight parts of the rubber, elastomer, and that the elastic modulus after hardening of the adhesive is equal to or greater than the elastic modulus of the sheet stated above.

The magnetic composite type damping material described above acts as a damping material having a magnetic force obtained by magnetization and a superficial adhesiveness owing to the fact that the adhesive resin is mixed in the magnetic composite type damping material with a high ratio.

Consequently, in a temperature range in the neighborhood of the softening temperature of the adhesive resin, adhering force at the surface of the magnetic composite sheet increases and it is stuck to the vibration source by the adhering force and the magnetic force. In this case, a structure is realized in which the sheet described above is put between the vibration source and the constraining plate and the vibration is converted into thermal energy by shear deformation of the sheet.

At a temperature below the softening point of the adhesive resin, the sheet is hardened and the adhesiveness at the surface decreases. Further, at the temperature above a softening point, the adhesive resin is rapidly plasticized. In addition, since the solubility of the adhesive resin to rubber increases, a part thereof moves to the interior of the rubber and the adhesiveness decreases. In these cases, the close contact of the damping material to the vibration source takes place mainly by attraction by magnetic force and vibration energy is converted into thermal energy by interfacial friction at the contact interface between the damping material and the vibration source. For this reason, the vibration damping characteristics show a relatively constant value outside of the temperature range in the neighborhood of the softening point of the adhesive resin and, in the temperature range in the neighborhood of the softening point, excellent characteristics can be obtained in a wide temperature range having a peak.

For an adhesive adhering the magnetic sheet to constraining plate, if the elastic modulus thereof after the hardening is smaller than the elastic modulus of the magnetic sheet, the sheet is not constrained, and the magnetic sheet is bound with the constraining plate and the magnetic sheet follows easily the vibration. Therefore vibration damping characteristics are lowered. Consequently, it is necessary that the elastic modulus after hardening is equal to or greater than the elastic modulus of the magnetic sheet. In the case where the elastic modulus of the adhesive is greater than the elastic modulus of the magnetic sheet, the structure is realized in which the adhesive layer is sandwiched between the constraining plate and the magnetic sheet having great elastic moduli, and the damping characteristics depend on the adhesive elastic characteristics of the adhesive.

Further, the magnetic composite sheet described above is attracted to the vibrating body by this magnetic force and small slips are produced at the interface by vibration of the vibrating body. Slipping friction at the interface converts vibration energy into thermal energy and thus realizes damping.

However, in the magnetic composite type damping material according to the first invention described above, since rubber is used in the magnetic composite sheet and it is so constructed that rubber molecules are crosslinked by vulcanization, the close contact property of the magnetic composite sheet with respect to an uneven surface of the material to be coupled therewith is bad. Even in the case where this magnetic composite sheet is humidified, it is only somewhat softened and plastic deformation hardly takes place. Therefore, when damping construction work is executed on a vibrating body having an uneven surface, it cannot be closely contacted with the whole surface of the damping material, but it is brought into contact therewith only at protruding portions. Consequently, it is difficult to absorb vibration of the vibrating body by slipping friction at the interface and the vibration damping property is lowered. Further, due to the fact that gaps between the vibrating body and the attracting surface are increased, attracting force by magnetic force is also lowered, which gives rise to a problem that the damping material falls off by vibration.

The second object of the present invention described previously has been set up for solving the above problem.

In order to achieve the above second object, a magnetic composite type damping material according to a second invention of the present application constructed by superposing a magnetic composite sheet on a constraining plate is characterized in that the magnetic composite sheet is a composite material whose base material is thermoplastic elastomer, to which plasticizer, magnetic powder, processing aiding agent, etc. are added, and that the content of the magnetic powder in the magnetic composite sheet is 50 to 95 weight % of the total weight of the sheet.

Since the base material of the magnetic composite sheet is a thermoplastic elastomer, the magnetic composite type damping material can follow well the uneven surface of the vibrating body and easily form close contact therewith by putting it in a state where it is softened by heating it. In this way it is possible to obtain an excellent close contact property.

Further, in execution of vibration damping construction work using this damping material, since it is sufficient to heat the damping material and stick it to the surface of the vibrating body, the execution can be carried out easily.

DETAILED DESCRIPTION

Hereinbelow, the present invention will be explained in detail, using several embodiments indicated in the attached drawings.

Figure 1:
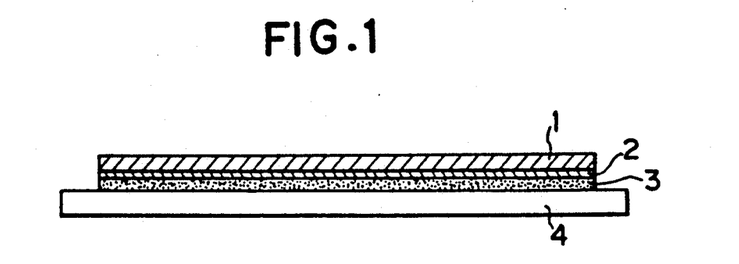
FIG. 1 is a cross-sectional view of a magnetic composite type damping material representing an embodiment of the first invention of the present application.

FIG. 1 is a cross-sectional view of a magnetic composite type damping material representing an embodiment of the first invention of the present application, in which reference numeral 1 is a constraining plate; 2 is an adhesive layer; 3 is a magnetic composite sheet; and 4 is a vibration source.

For the constraining plate 1 having a great elastic modulus, a metal plate made of iron, aluminium, stainless steel, copper, etc., a plastic plate made of phenol resin, polyamide, polycarbonate, polyester, etc., a fiber reinforced plastic plate fabricated by reinforcing this plastic plate by using fiber such as glass fiber, carbon fiber, etc., or an inorganic rigid plate such as a slate plate, a hydrated calcium silicate plate, a plaster board, a fiber mixed cement plate, a ceramic plate, etc. can be used. The constraining plate 1 is from 1 to 40 mm thick, preferably about 5 to 20 mm thick.

Further, in the case where a hydrated calcium silicate plate, a plaster board, a fiber mixed cement plate, etc. are used for the constraining plate, it is possible to decrease remarkably the water content ratio of the constraining plate by coating the whole surface of the constraining plate with a painting material. In this way, it is possible to prevent cracking of the constraining plate due to freezing and dissolving of absorbed water. Apart therefrom, by effecting the coating, it is possible to protect the materials against various environment factors such as sun light (ultraviolet ray), rain, sulfur dioxide, ozone, etc., and thus the durability thereof can be increased.

For the paint for coating the constraining plate, an oil paint, a nitrocellulose paint, an alkyd resin paint, an aminoalkyd resin paint, a vinyl resin paint, acryl resin paint, an epoxy resin paint, an urethane resin paint, a polyester resin paint, a paint of chlorinated rubber, an inorganic paint, etc. can be used.

For the adhesive for the adhesive layer 2, such a rigidity that the elastic modulus thereof is equal to or greater than the elastic modulus of the magnetic composite sheet is necessary. As described previously, if the elastic modulus of the adhesive is smaller than the elastic modulus of the magnetic composite sheet, no construction is realized in which the magnetic composite sheet is bound with the constraining plate, and the magnetic composite sheet easily vibrates. Therefore, the vibration damping property thereof decreases.

For the adhesive epoxy resins, urea resins, melamine resins, phenol resins, vinyl acetates, cyanoacrylates, urethanes, synthetic rubbers, acrylic resins, etc. can be used.

For the polymeric material used for the magnetic composite sheet 3, natural rubber, nitrile rubber, styrene-butadiene rubber, epichlorohydrin, rubber urethane rubber, polynorbornene rubber, ethylene acryl rubber, etc. can be used.

Further, for the adhesive resin added to the magnetic composite sheet, resins of coumarons, which are mixtures of coumaron-inden resin, naphthenic oil, phenol resin, etc., resins of phenol-terpenes such as p-tertiary-butylphenol acetylene resin, phenol formaldehyde resin, terpene phenol resin, polyterpene resin, xylene formaldehyde resin, etc., petroleum hydrocarbon resins such as synthetic polyterpene resin, aromatic hydrocarbon resin, aliphatic hydrocarbon resin, unsaturated hydrocarbon polymer, hydrogen added hydrocarbon resin, polybutene, etc., can be used.

Still further, for the plasticizer added to the magnetic composite sheet, petroleum process oils such as process oil of paraffins, process oil of naphthenes aromatic process oils, etc., vegetable oils such as linseed oil, rapeseed oil, etc., phthalic acid derivatives such as di-(2-ethylhexyl) phthalate, diundecyl phthalate, dioctyl phthalate, etc., adipic acid derivatives such as diisobutyl adipate, di-(2-ethylhexyl) adipate, etc., azelaic acid derivatives such as di-(2-ethylhexyl) azelate, etc., epoxy derivatives. etc. can be used.

For the magnetic powder added to the magnetic polymer adhesive elastic sheet, ferrites such as barium ferrite, strontium ferrite, etc., rare earth magnetic powders such as samarium cobalts, neodium-iron-borons, etc., can be used.

Still further, as blending agents added to the magnetic composite sheet, there are vulcanizing agents and vulcanization accelerators, which are selected, depending on the kind of rubber, and blended by a suitable amount. Furthermore, apart therefrom, a filler, a processing aid, an antioxidant, etc. may be added thereto.

The magnetic composite sheet may be from 0.1 to 10 mm thick, preferably 3 to 7 mm thick. If the constraining plate and the magnetic composite sheet are too thin, in the case where the vibration source is thick and vibration energy is great, the vibration energy cannot be satisfactorily absorbed and thus no realistic effect can be effected. On the contrary, if they are too thick, this gives rise to a possibility that they fall off because of increase in the weight.

The rubber used for the magnetic polymer adhesive elastic sheet may be vulcanized after or at the same time as the processing thereof into a sheet. If the rubber is not bridged, the whole magnetic composite sheet may be plasticized when the temperature rises. The rigidity cannot be held and slipping friction at the interface thereof with the vibration source cannot be expected.

The added amounts of the adhesive resin and the plasticizer added to the magnetic composite sheet are 30 to 90 weight parts, preferably 40 to 70 weight parts and 5 to 100 weight parts, preferably 10 to 40 weight parts, respectively, with respect to the rubber of 100 weight parts. If the added amounts of the adhesive resin and the plasticizer are too great, the rigidity of the magnetic composite sheet cannot be held at high temperatures and easiness of the processing into a sheet is lowered. On the other hand, if the added amounts thereof are too small, transfer thereof to the surface of the magnetic composite sheet is small and no satisfactory superficial adhering property can be secured.

Further, the added amount of the magnetic powder added to the magnetic composite sheet may be 50 to 95 weight %, preferably 70 to 85 weight % with respect to the whole blended materials. Since the magnetic force of the magnetic composite sheet is determined by the added amount of the magnetic powder, if the added amount is small, fall off, etc. take place. On the contrary, if the added amount is too great, easiness of the processing of the magnetic composite sheet is lowered and it become fragile.

The magnetic composite sheet is subjected to magnetizing processing after the forming processing. The magnetization is one side multiple pole magnetization by which S and N poles are arranged alternately on one side surface of the magnetic composite sheet. The pitch between the S and N poles is 1 to 20 mm, preferably about 4 to 10 mm. In the case where the magnetization pitch is smaller or greater than these values, attracting force of the magnetic composite sheet decreases.

EMBODIMENT 1

The blended materials indicated in TABLE 1 shown below were kneaded and formed into a sheet 3 mm thick by effecting forming and vulcanization by using a metal die. One side multiple pole magnetization was carried out with a pitch of 8 mm by means of a magnetizer. The residual magnetic flux density of the magnetic composite sheet at this time was 450 Gauss.

For the constraining plate having a great elastic modulus, a plate 14 mm thick made of hydrated calcium silicate was used and a one-liquid type adhesive of urethanes was used as the adhesive. The magnetic composite sheet was bonded to the constraining plate by using the adhesive. They were held together with a pressure of about 0.5 kgf/cm² until the adhesive hardened, to obtain a damping material.

TABLE 1

| Recipe in EMBODIMENT 1 | |
|---|---|
| acrylic rubber | 100 (weight parts) |
| stearic acid | 1 |
| antioxidant | 2 |
| coumaron-inden resin | 40 |
| process oil | 40 |
| carbon black | 40 |
| strontium ferrite powder | 700 |
| vulcanizing agent | 2 |
| sum | 925 |

The elastic moduli (E) of the magnetic composite sheet and the adhesive were $2.3 \times 10^8$ dyne/cm² (25° C.) and $1.8 \times 10^{10}$ dyne/cm² (25° C.), respectively.

EMBODIMENT 2

The blended materials indicated in TABLE 2 were kneaded and formed into a sheet 3 mm thick by affecting forming and vulcanization by using a metal die. One side multiple pole magnetization was carried out with a pitch of 8 mm by means of the magnetizer. The residual magnetic flux density of the magnetic composite sheet at this time was 440 Gauss.

For the constraining plate having a great elastic modulus, a plate 14 mm thick made of hydrated calcium silicate was used and a one-liquid type adhesive of urethanes was used as the adhesive. The magnetic composite sheet was stuck to the constraining plate by using the adhesive. They were held together with a pressure of about 0.5 kgf/cm² until the adhesive hardened, to obtain a damping material.

TABLE 2

| Recipe in EMBODIMENT 2 | |
|---|---|
| acrylonitrile butadiene rubber | 100 (weight parts) |
| stearic acid | 2 |
| zinc oxide | 5 |
| plasticizer | 4 |
| antioxidant | 2 |
| polyterpene resin | 60 |
| dioctyl phthalate | 10 |
| process oil | 30 |
| strontium ferrite powder | 650 |
| vulcanizing agent | 1 |
| vulcanization accelerator | 3 |
| sum | 867 |

The elastic moduli (E) of the magnetic composite sheet and the adhesive were $8.9 \times 10^8$ dyne/cm² (25° C.) and $1.8 \times 10^{10}$ dyne/cm² (25° C.), respectively.

EMBODIMENT 3 AND EMBODIMENT 4

The sheet indicated in EMBODIMENT 1 was used for the magnetic composite sheet and for the adhesive and the constraining plate the materials indicated in TABLE 3 were used to fabricate respective damping materials.

TABLE 3

| Materials used for damping materials in EMBODIMENT 3 and EMBODIMENT 4 | | |
|---|---|---|
| | EMBODIMENT 3 | EMBODIMENT 4 |
| adhesive | one-liquid type urethane adhesive (same as that used in EMBODIMENT 1) | two-liquid type epoxy adhesive |
| constraining plate | iron plate 3 mm thick | hydrated calcium silicate plate |
| | (same as that used in EMBODIMENT 1) | |

When the magnetic composite sheet was bonded to the constraining plate by using the adhesive, together they were held, with a pressure of about 0.5 kgf/cm² until the adhesive hardened.

The residual magnetic flux density of the damping material fabricated in EMBODIMENT 3 was 450 Gauss and the elastic moduli (E) of the magnetic composite sheet and the adhesive were $2.3 \times 10^8$ dyne/cm² (25° C.) and $1.8 \times 10^{10}$ dyne/cm² (25° C.), respectively.

The residual magnetic flux density of the damping material fabricated in EMBODIMENT 4 was 450 Gauss and the elastic moduli (E) of the magnetic composite sheet and the adhesive were $2.3 \times 10^8$ dyne/cm² (25° C.) and $8.0 \times 10^{10}$ dyne/cm² (25° C.), respectively.

Next, the following damping material was fabricated for comparison.

Blended materials, to which neither adhesive resin nor plasticizer was added, as indicated in TABLE 4, were used for the magnetic composite sheet. They were formed into a sheet 3 mm thick by effecting forming and vulcanization by using a metal die. One side multiple pole magnetization was carried out with a pitch of 8 mm by means of a magnetizer to fabricate a magnetic composite sheet having a low adhering force. The residual magnetic flux density of the magnetic composite sheet at this time was 490 Gauss.

The magnetic composite sheet described above was bonded to a plate 14 mm thick made of hydrated calcium silicate serving as the constraining plate by using a one-liquid type adhesive of urethanes. They were held together with a pressure of about 0.5 kgf/cm² until the adhesive hardened, to obtain a damping material.

TABLE 4

| Recipe in EXAMPLE FOR COMPARISON 1 | |
|---|---|
| acrylic rubber | 100 (weight parts) |
| stearic acid | 2 |
| antioxidant | 2 |
| plasticizer | 5 |
| carbon black | 40 |
| strontium ferrite powder | 500 |
| vulcanizing agent | 2 |
| sum | 651 |

The elastic moduli (E) of the magnetic polymer adhesive elastic sheet and the adhesive were $1.7 \times 10^9$ dyne/cm² (25° C.) and $1.8 \times 10^{10}$ dyne/cm² (25° C.), respectively.

EXAMPLE FOR COMPARISON 2

The magnetic composite sheet used in EMBODIMENT 1 was used. The vibration damping effect was confirmed by making the magnetic composite sheet attract the vibration source only by the attracting force of the sheet without using the other members such as the constraining plate, the adhesive, etc.

EXAMPLE FOR COMPARISON 3

The vibration damping effect was confirmed in a state where the damping material fabricated in EMBODI- MENT 1 was adhered to the vibration source by using a one-liquid type adhesive of urethanes. When the damping material was bonded to the vibration source, they were held together with a pressure of about 0.5 kgf/cm$^2$, until the adhesive hardened.

Next vibration damping property tests were effected for the damping material fabricated in the embodiments and the examples for comparison described above.

VIBRATION DAMPING PROPERTY TESTS

Rectangular base plates (these plates serving as the vibration source) are formed from an iron plate 3 mm thick. The damping materials having the same size as that described above and fabricated in the embodiments and the examples for comparison described above, are bonded thereto. The central portion of each of the base plates is vibrated by means of an electric vibrator. The frequency of the applied vibration is varied, while measuring the force and the acceleration of the vibration by means of a piezoelectric crystal put therebetween. A device for calculating mechanical impedance at the point, to which the vibration is applied, to deduce the loss factor (value indicating how rapidly the vibration is attenuated) from a resonance curve, is used (mechanical impedance method).

Figure 2:
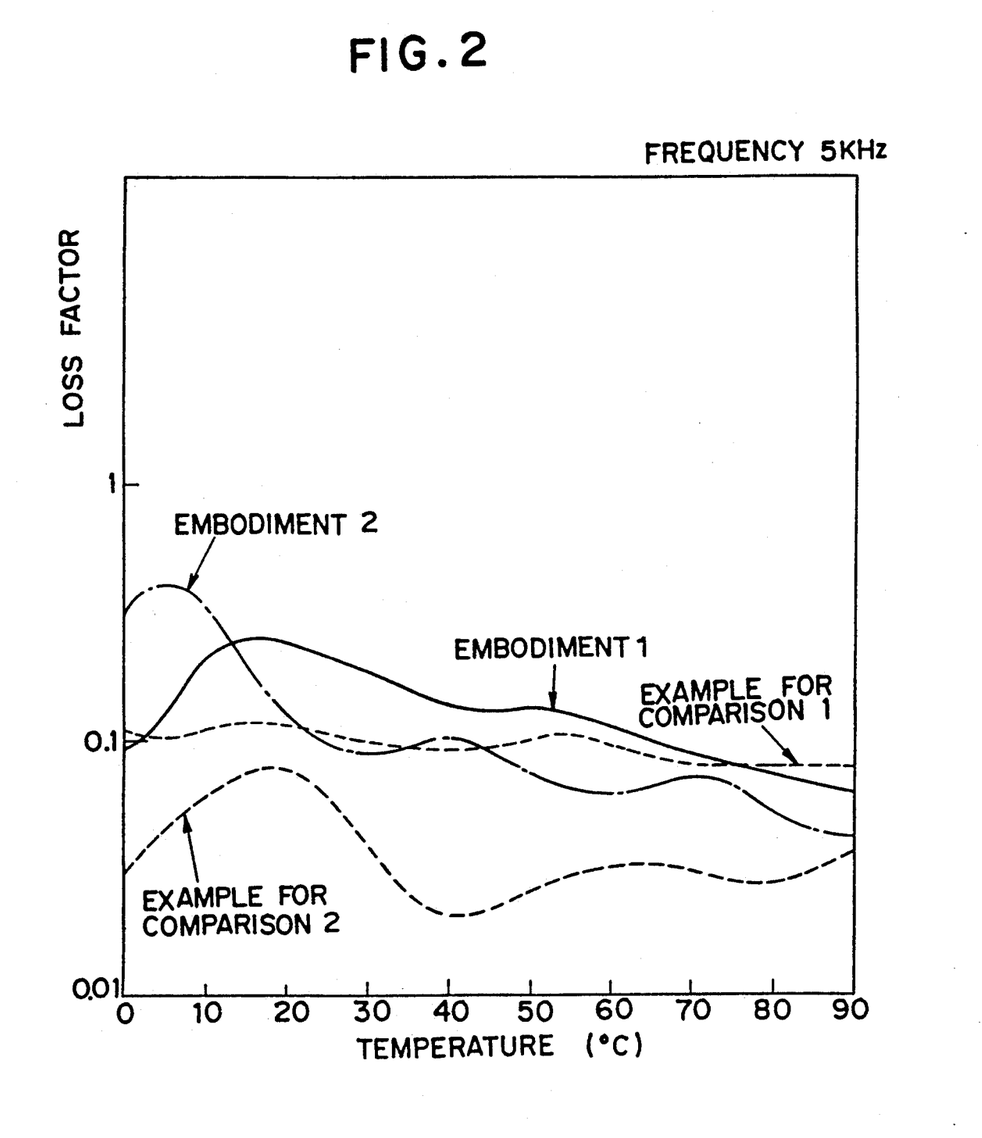
FIG. 2 indicates graphs representing the vibration damping property of various embodiments of the first invention and several examples for comparison.
Figure 3:
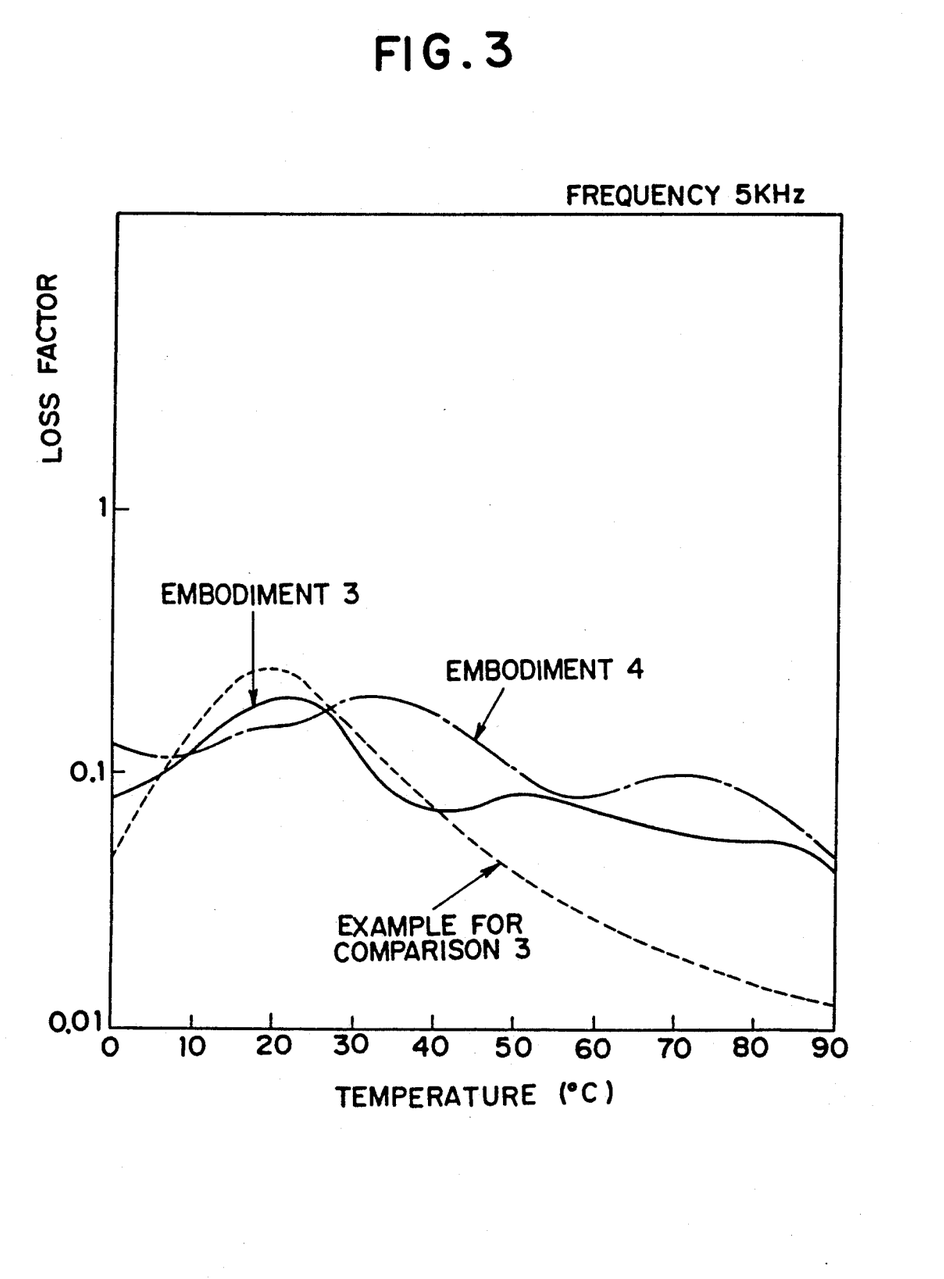
FIG. 3 indicates also graphs representing the vibration damping property of various embodiments and several examples for comparison.

Measurement results of the loss factor obtained for the damping materials fabricated in the embodiments and the examples for comparison described above are indicated in FIGS. 2 and 3.

The following points can be understood from the measurement results of the loss factor obtained for the damping materials fabricated in the embodiments and the examples for comparison described above.

(1) In the case where the magnetic composite sheet alone is bonded to the vibration source (EXAMPLE FOR COMPARISON 2), the value of the loss factor is significantly smaller than that obtained for the magnetic composite type damping material according to the present invention (EMBODIMENT 1), in which the constraining plate is adhered thereto, and the damping property thereof is low.

(2) For a damping material (EXAMPLE FOR COMPARISON 1), in which no adhesive resin plasticizer is added to the magnetic composite sheet and therefore the adhering force thereof is decreased, since the vibration damping takes place mainly by slipping friction at the interface between the damping material and the vibration source, the vibration damping characteristics are represented by a relatively low constant value.

(3) In the case where the magnetic composite type damping material is bonded to the vibration source by means of an adhesive (EXAMPLE FOR COMPARISON 3), no slight slips are produced at the interface between the damping material and the vibration source and a construction is realized in which the magnetic composite sheet is bound with the constraining plate and the vibration source. The vibration damping characteristics indicate a great temperature dependence and have a peak at a temperature in the neighborhood of the glass transition point of the magnetic composite sheet. For this reason, the vibration damping property is good in a temperature region in the neighborhood of the glass transition point of the magnetic composite sheet, but decreases rapidly in other temperature ranges.

(4) In the damping material according to the first invention (EMBODIMENT 1 to 4), the adhesive resin moves to the surface of the magnetic composite sheet and in the temperature region in the neighborhood of the softening point of the adhesive resin adhesiveness of the surface of the rubber increases and a construction is realized in which the magnetic composite sheet is bound with the constraining plate and vibration source. Further, for the temperatures other than the softening point of the adhesive resin, since it is hardened and the adhesiveness thereof decreases rapidly at low temperatures and it is plasticized and the adhesiveness thereof decreases at high temperatures, slight slips are apt to take place at the interface between the damping material and the vibration source.

In this way, an excellent vibration damping property can be obtained, in which although there is a peak in a certain temperature region, certain characteristics are secured in a wide temperature range.

The temperature at which the peak of the vibration damping property exists can be adjusted by varying the kinds of the adhesive resin, the plasticizer and the rubber.

Further, in the case of increased vibration energy of the vibration source, a practical effect can be expected by increasing the thickness of the damping material.

As described above, according to the first invention, since not only the magnetic composite sheet constituting the magnetic composite type damping material has an attractive force by magnetic force but also it is provided with superficial adhesiveness, a magnetic composite type damping material exhibiting an excellent vibration damping property in a wide temperature region can be obtained by the synergistic effect of the magnetic force and the adhering force.

Figure 4:
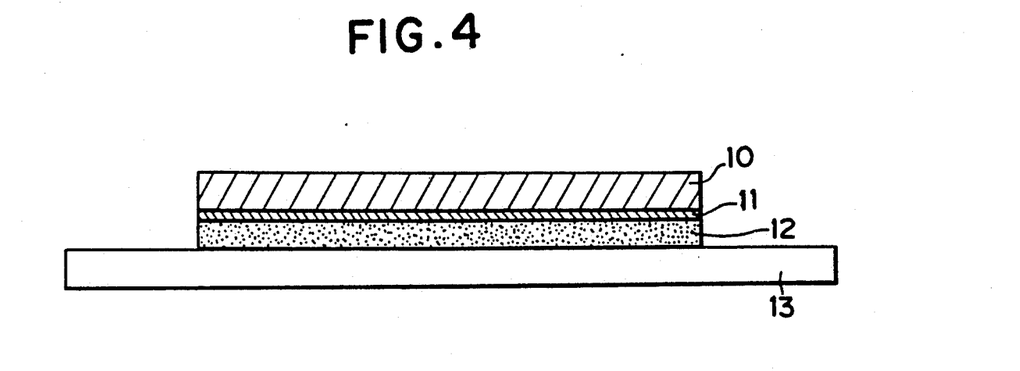
FIG. 4 is a cross-sectional view of a magnetic composite type damping material representing an embodiment of the second invention of the present application.

FIG. 4 is a cross-sectional view of a magnetic composite type damping material representing an embodiment of the second invention, in which reference numeral 10 is a constraining plate; 11 is an adhesive layer; 12 is a magnetic composite sheet; and 13 is a vibration source.

For the constraining plate 10, just as for the first invention, a metal plate made of iron, aluminium, stainless steel, etc., a plastic plate made of phenol resin, polyamide, polycarbonate, polyester, etc., a fiber reinforced plastic plate fabricated by reinforcing this plastic plate by using fiber such as glass fiber, carbon fiber, etc., or an inorganic rigid plate such as a slate plate, a hydrated calcium silicate plate, a plaster board, a fiber mixed cement plate, a ceramic plate, etc., can be used. The constraining plate 1 is from 1 to 40 mm thick, preferably about 5 to 20 mm thick.

For the adhesive used for the adhesive layer 11, a rigidity such that the elastic modulus thereof is equal to or greater than the elastic modulus of the magnetic composite sheet is necessary. If the elastic modulus of the adhesive is smaller than the elastic modulus of the magnetic composite sheet, a construction is hardly realized in which the magnetic composite sheet is bound with the constraining plate, and the magnetic composite sheet follows easily vibration. Therefore the vibration damping property thereof decreases.

For the adhesive, epoxy resins, urea resins, melamine resins, phenol resins, vinyl acetates, cyanoacrylates, urethanes, synthetic rubbers, acrylic resins, etc., can be used.

For the polymer material used for the magnetic composite sheet, thermoplastic elastomers such as thermoplastic elastomers of styrenes, thermoplastic elastomers of vinyl chlorides, thermoplastic elastomers of olefins, thermoplastic elastomers of polyesters, thermoplastic elastomers of polyamides, thermoplastic elastomers of urethanes, etc., can be used. Since molecules are crosslinked in the thermosetting plastic elastomers and vulcanized rubber, in the case where they are subjected to heating treatment, although they are somewhat softened, no plastic deformation takes place and they are not suitable.

Further, just as for the first invention, for the magnetic power added to the magnetic composite sheet, ferrites such as barium ferrite, strontium ferrite, etc., rare earth magnetic powders such as samarium cobalts, neodium-iron-borons, etc., can be used.

The added amount of the magnetic powder added to the magnetic composite sheet may be 50 to 95 weight %, preferably 70 to 85 weight %, with respect to the whole blended materials. Concerning influences of the added amount of the magnetic powder on the magnetic composite sheet, if the added amount is small, falldown, etc. take place. On the contrary, if the added amount is too great, easiness of the processing of the magnetic composite sheet is lowered and it become fragile so that it is broken upon shock, etc.

Apart therefrom, an antioxidant, a tackifier, a plasticizer, a filler, a processing aid, a coupling agent, not vulcanized rubber, liquid rubber, etc., may be added to the magnetic composite sheet.

The magnetic composite sheet may be 0.1 to 10 mm, preferably 3 to 7 mm thick. If the constraining plate and the magnetic composite sheet are too thin, in the case where the vibration source is thick and vibration energy is great, the vibration energy cannot be satisfactorily absorbed and thus no effect can be obtained. On the contrary, if they are too thick, this gives rise to a possibility that they fall off because of increase in the weight.

the magnetic composite sheet is subjected to magnetizing processing after the forming processing. The magnetization is preferably one side multiple pole magnetization, by which S and N poles are arranged alternately on one side surface of the magnetic composite sheet. The pitch between the S and N poles is 1 to 20 mm, preferably about 4 to 10 mm. In the case where the magnetization pitch is smaller or greater than these values, the attracting force of the magnetic composite sheet decreases.

Vibration damping construction work using the magnetic composite type damping material is carried out by softening the magnetic composite sheet by heating the surfaces thereof and by sticking it to the vibration source in this state.

At this time, even if the surface of the vibration source is uneven because of irregularities in the painting, traces of welding, etc., since the magnetic composite sheet is softened by heat and it is in a state where it is plastically deformable, the surface of the magnetic composite sheet can follow well the unevenness of the vibration source and it can be brought into complete contact therewith. Further, although a satisfactory contact area can be more or less secured, because the damping material holds its attracting force by magnetic force, it is possible to increase further the contact area by thrusting the damping material to the vibration source with pressure by applying an external force thereto.

The temperature, to which the magnetic composite sheet is heated, is between the softening point of the magnetic composite sheet $-20°$ C. and the softening point $+100°$ C., preferably between the softening point and the softening point $+10°$ C. If this temperature of the magnetic composite sheet is too low, plastic deformation hardly takes place and it is difficult for it to follow the uneven surface of the vibration source. On the contrary, if this temperature is too high, the magnetic composite sheet is deteriorated by heat. Furthermore, the shape is deformed by excessive softening or movement of the magnetic powder is apt to take place and thus, magnetic force decreases.

Still further, the damping material may be thrust toward the vibration source by using an external force. This external force may be smaller than 2 $kgf/cm^2$, preferably smaller than about 0.5 $kgf/cm^2$. If the external force is too strong, the plastic deformation may be too great.

EMBODIMENT 5

The blended materials indicated in TABLE 5 shown below were kneaded by means of a pressurized kneader and formed into a sheet 3 mm thick by effecting extrusion formation to obtained a magnetic composite sheet for the magnetic composite type damping material having the construction indicated in FIG. 4. One side multiple pole magnetization was carried out with a pitch of 8 mm by means of a magnetizer. The residual magnetic flux density of the magnetic composite sheet at this time was 470 Gauss.

TABLE 5

| Recipe in EMBODIMENT 5 | |
| --- | --- |
| thermoplastic elastomer of styrene-isoprene-styrene | 100 (weight parts) |
| stearic acid | 2 |
| antioxidant | 5 |
| carbon black | 10 |
| process oil | 20 |
| strontium ferrite powder | 600 |
| plasticizer | 20 |
| sum | 757 |

For the constraining plate, a plate 14 mm thick made of hydrated calcium silicate was used and a two-liquid hardening type adhesive of urethanes was used as the adhesive. The damping material was obtained by bonding the magnetic composite sheet to the constraining plate by using the adhesive.

EXAMPLE FOR COMPARISON 4

The blended materials indicated in TABLE 6 shown below were kneaded by means of a pressurized kneader and formed into a sheet 3 mm thick by effecting forming and vulcanization by using a metal die. One side multiple pole magnetization was carried out with a pitch of 8 mm by means of a magnetizer. The residual magnetic flux density of the magnetic composite sheet at this time was 450 Gauss.

For the constraining plate, a plate 14 mm thick made of hydrated calcium silicate was used and a two-liquid hardening type adhesive of urethanes was used as the adhesive. The damping material was obtained by bonding the magnetic composite sheet to the constraining plate by using the adhesive.

This process differs from that used in EMBODIMENT 5 in that rubber is used for the magnetic composite sheet and that rubber molecules are crosslinked by vulcanization.

TABLE 6

| Recipe in EXAMPLE FOR COMPARISON 4 | |
| --- | --- |
| acrylic rubber | 100 (weight parts) |
| stearic acid | 1 |

TABLE 6-continued

| Recipe in EXAMPLE FOR COMPARISON 4 | |
| --- | --- |
| antioxidant | 2 |
| plasticizer | 80 |
| carbon black | 40 |
| strontium ferrite powder | 700 |
| vulcanizing agent | 2 |
| sum | 925 |

Next, vibration damping property tests were effected for the damping material fabricated in the embodiments and the examples for comparison of the second invention.

The vibration damping property tests were effected as follows. Rectangular base plates (this plate serving as the vibration source) are formed from an iron plate 3 mm thick. The damping materials having the same size as that described above and fabricated in the embodiments and the examples for comparison described above, are stuck thereto. The central portion of each of the base plates is vibrated by means of an electric vibrator. The frequency of the applied vibration is varied, while measuring the force and the acceleration of the vibration by means of a piezoelectric crystal put therebetween. A device for calculating mechanical impedance at the point, to which the vibration is applied, to deduce the loss factor from a resonance curve, is used (mechanical impedance method). A metal piece 1 mm high, 2 mm wide and 10 mm long was bonded previously to the base plate, supposing irregularities in the painting and unevenness, such as traces of welding.

The damping material is heated to 120° C. when the damping material is bonded to the base plate and this is attracted by magnetic force through the base plate, to which the metal piece is adhered. Measurement is started, after having left them, until the temperature is lowered to the room temperature. Results of the vibration damping property tests are indicated by graphs in FIG. 5. However, in the vibration damping property tests of the damping material fabricated in EXAMPLE FOR COMPARISON 4, the magnetic composite sheet cannot be brought into close contact with an uneven surface and when it is bonded to the base plate, it is in a state where it is bonded thereto only through the metal plate. Thus the damping material fell off during the test and it was not possible to effect the measurements.

On the contrary, in the damping material fabricated in EMBODIMENT 5, the magnetic composite sheet was softened by heat so that plastic deformation took place therein. Therefore, it was brought into close contact with the base plate, to which the metal piece was adhered by magnetic force. It didn't fall off during the test and exhibited an excellent vibration damping property.

Figure 5:
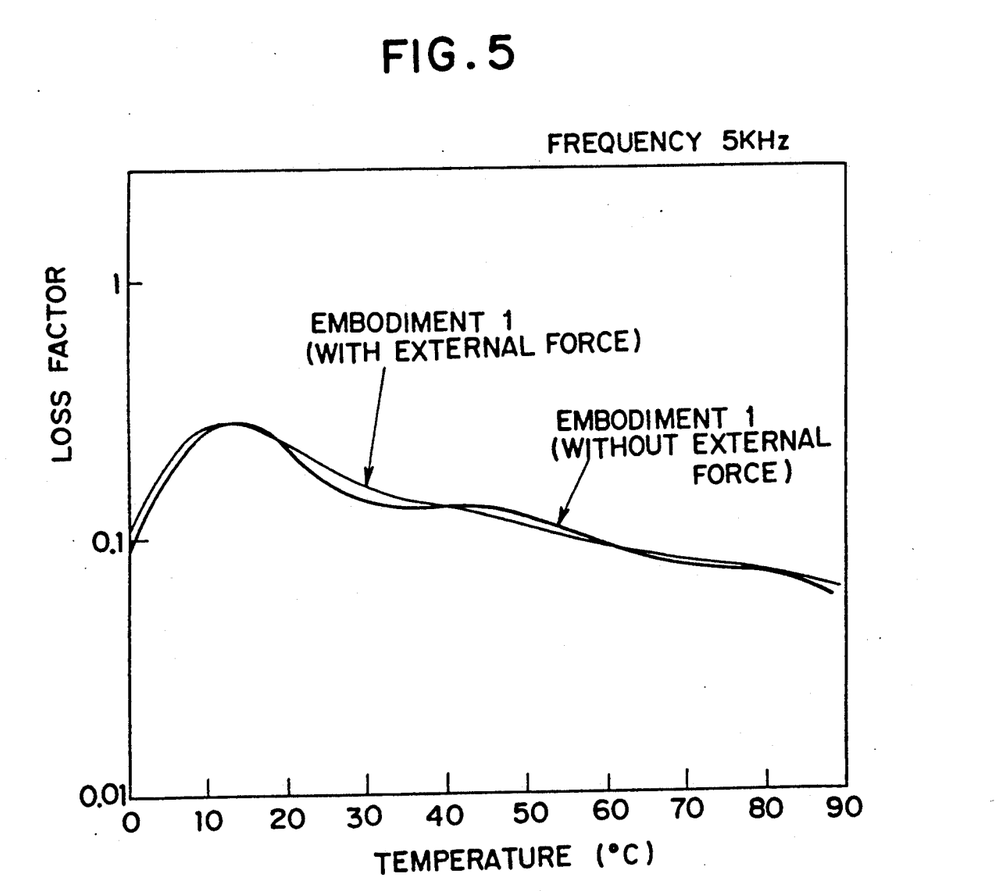
FIG. 5 indicates graphs representing the vibration damping property of the embodiment.

Contrary to the fact that the damping material fabricated in EXAMPLE FOR COMPARISON 4 could not be brought into close contact with an uneven surface, even if it was thrusted to the base plate, to which the metal piece was adhered, with an external force of 0.2 kgf/cm$^2$, after having heated the damping material to 120° C., when it was bonded to the base plate, and the damping material fell off during the tests so that it was not possible to effect the measurements, in the damping material fabricated in EMBODIMENT 5, the magnetic composite layer was brought into close contact with the base plate while producing plastic deformation therein, it didn't fall off during the tests and it exhibited an excellent vibration damping property, as indicated by the graphs indicated in FIG. 5.

EMBODIMENT 6

The blended materials indicated in TABLE 3 shown below were kneaded by means of a pressurized kneader and formed into a sheet 3 mm thick by effecting press formation by means of a metal die to obtain a magnetic composite sheet. One side multiple pole magnetization was carried out with a pitch of 8 mm by means of a magnetizer. The residual magnetic flux density of the magnetic composite sheet at this time was 440 Gauss.

TABLE 7

| Recipe for magnetic composite sheet in EMBODIMENT 6 | |
| --- | --- |
| thermoplastic elastomer compound of vinyl chlorides | 100 (weight parts) |
| coupling agent | 4 |
| process oil | 15 |
| antioxidant | 2 |
| strontium ferrite powder | 400 |
| sum | 521 |

For the constraining plate, a plate 14 mm thick made of hydrated calcium silicate was used and a one-liquid hardening type adhesive of urethanes was used as the adhesive. The damping material was obtained by bonding the magnetic composite sheet to the constraining plate by using the adhesive. They were held together with a pressure of 0.5 kgf/cm$^2$ until the adhesive was hardened.

EMBODIMENT 7

The blended materials indicated in TABLE 8 shown below were kneaded by means of a pressurized kneader and formed into a sheet 5 mm thick by effecting press formation by means of a metal die to obtain a magnetic composite sheet. One side multiple pole magnetization was carried out with a pitch of 10 mm by means of a magnetizer. The residual magnetic flux density of the magnetic composite sheet at this time was 480 Gauss.

TABLE 8

| Recipe in EMBODIMENT 7 | |
| --- | --- |
| thermoplastic elastomer compound of olefins | 100 (weight parts) |
| coupling agent | 4 |
| plasticizer | 20 |
| antioxidant | 2 |
| tackifier | 5 |
| strontium ferrite powder | 450 |
| sum | 581 |

For the constraining plate, a plate 3 mm thick made of iron was used and a two-liquid hardening type adhesive of urethanes was used as the adhesive. The damping material was obtained by bonding the magnetic composite sheet to the constraining plate by using the adhesive.

For the damping materials fabricated in EMBODIMENTs 6 and 7 the vibration damping property tests were effected.

Figure 6:
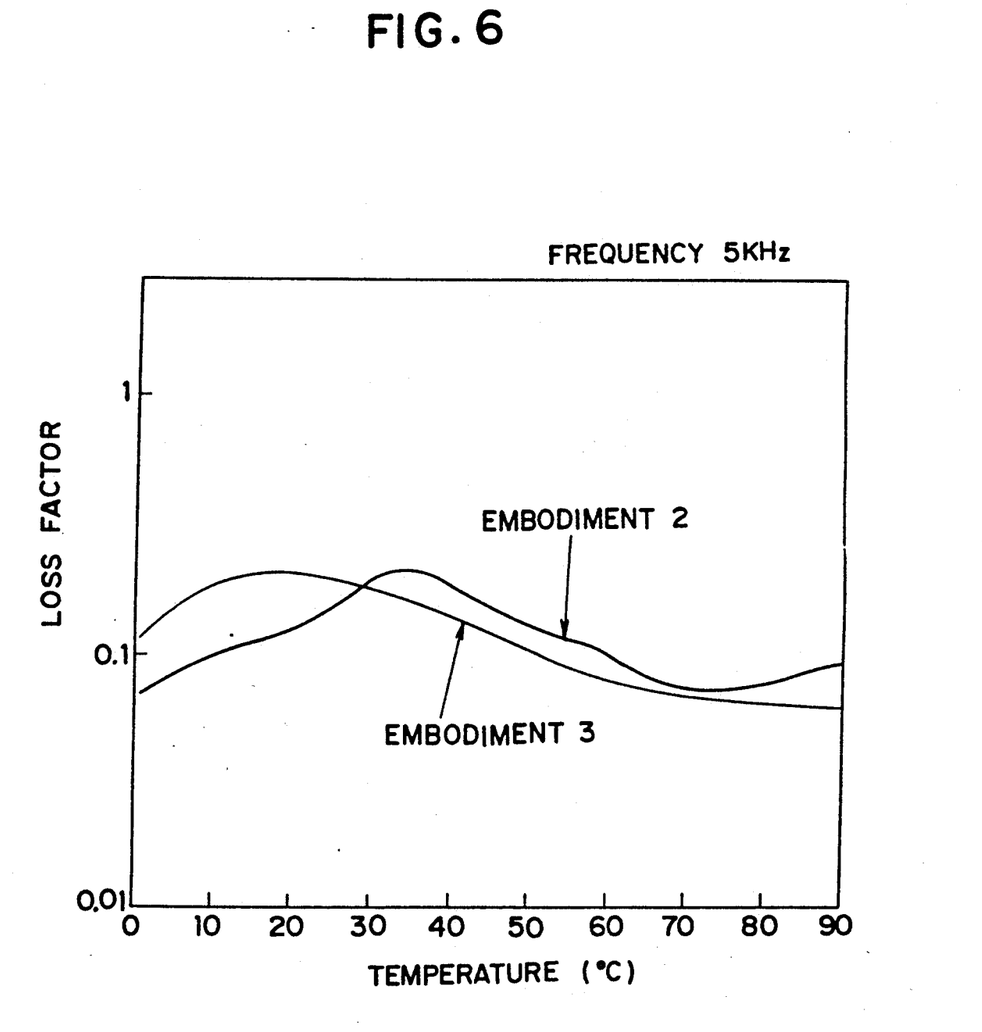
FIG. 6 indicates graphs representing the vibration damping property of various embodiments of the second invention without external force.

The vibration damping property tests were effected by the method described previously. However, conditions under which the magnetic composite type damping materials were heated when the damping materials were bonded to the base plates were as follows; i.e., they were bonded thereto at 150° C. in EMBODIMENT 6 and at 180° C. in EMBODIMENT 7. Further thrusting together with pressure by using external force was not effected at this time. Results of the vibration damping property tests are indicated by graphs in FIG. 6.

In both the damping materials fabricated in EMBODIMENTs 6 and 7, the magnetic composite layers were softened by heat and plastic deformation took place therein. Thus, they were brought into close contact with the base plates to which the metal plates were adhered, and they didn't fall off during the tests and they exhibited excellent vibration damping properties.

As explained above, according to the second invention, since the magnetic composite type damping material is so constructed that the magnetic composite sheet, whose base material is a thermoplastic elastomer, is adhered to the constraining plate and vibration damping construction work can be effected in a state where the magnetic composite sheet is softened by heat when it is bonded to the vibrating body, so that plastic deformation takes place easily and it is possible to bring it into close contact even with a vibrating body having an uneven surface such as traces of welding, traces of rivets, irregularities in painting, etc. Thus, vibration damping can be realized using efficiently slipping friction at the interface of the vibrating body. In this way, a magnetic composite type damping material can be obtained in which magnetic force can act efficiently thereon for preventing the fall-off thereof by making the shape of the magnetic composite sheet follow variations in the shape of the vibration source, owing to the advantages described above.

Further, according to the second invention, owing to the fact that the polymer material used in the magnetic composite sheet is made of a thermoplastic elastomer, intermolecular crosslinking required for thermosetting elastomer and vulcanized rubber is unnecessary. Thus, the vulcanizing process can be omitted and easiness of processing can be increased.

In addition, according to the second invention, since a magnetic composite type damping material constructed by adhering a magnetic composite sheet, whose base material is thermoplastic elastomer, to a constraining plate, is used, it is possible to bring the damping material into close contact with the vibration source to make it exhibit its vibration damping effect as well as possible only by heating the damping material and further to increase remarkably the operability of the vibration damping construction work.

The embodiments of the invention in which an exclusive property or privilege is claimed are defined as follows:

1. In a magnetic composite damping material made by bonding an adhesive elastic sheet to a constraining plate by using an adhesive, the improvement comprising said elastic sheet is a magnetic composite material having one side multiple pole magnetization and a pitch between S and N poles of from 1 to 20 mm, said composite material comprising 100 parts by weight of an elastomer, 30 to 90 parts by weight of an adhesive resin, 5 to 100 parts by weight of a plasticizer and 50 to 95 wt. % of magnetic powder, said wt. % of magnetic powder being based on the total weight of the sheet, the elastic modulus of said adhesive after hardening being equal to or greater than the elastic modulus of the adhesive elastic sheet.

2. A magnetic composite damping material according to claim 1, wherein said adhesive elastic sheet is 0.1 to 10 mm thick; said elastomer is acrylic rubber; and said constraining plate is a hydrated calcium silicate plate or a slate plate 1 to 40 mm thick.

3. A adhesive elastic damping material according to claim 1, wherein whole surfaces of said constraining plate are coated with a paint.

4. In an adhesive elastic damping material made by bonding an adhesive elastic sheet to a constraining plate by using an adhesive, the improvement comprising said elastic sheet is a magnetic composite material having one side multiple pole magnetization and a pitch between S and N poles of from 1 to 20 mm, said composite material comprising a thermoplastic elastomer base material, an adhesive resin, a plasticizer, magnetic powder and a processing aid, said magnetic powder being present in said elastic sheet in an amount of from 50 to 95 wt. % based on the total weight of the sheet, the elastic modulus of said adhesive after hardening being equal to or greater than the elastic modulus of the adhesive elastic sheet.

5. A adhesive elastic damping material according to claim 4, wherein said adhesive elastic sheet is 0.1 to 10 mm thick; said thermoplastic elastomer is a thermoplastic elastomer of styrene-isoprene-styrene copolymer; and said constraining plate is a hydrated calcium silicate plate or a slate plate 1 to 40 mm thick.

* * * * *